United States Patent [19]
Lee et al.

[11] Patent Number: 5,106,544
[45] Date of Patent: Apr. 21, 1992

[54] METHOD OF AND APPARATUS FOR VAPOR DISTRIBUTION

[75] Inventors: Adam Lee, Richardson; Gilbert Chen, Farmers Branch, both of Tex.; Timothy Holmes, Andover, N.J.

[73] Assignee: Glitsch, Inc., Dallas, Tex.

[21] Appl. No.: 653,680

[22] Filed: Feb. 11, 1991

Related U.S. Application Data

[63] Continuation-in-part of Ser. No. 472,835, Jan. 31, 1990, abandoned.

[51] Int. Cl.$^5$ .............................................. B01F 3/04
[52] U.S. Cl. ................................... 261/79.2; 261/96; 261/98
[58] Field of Search ................... 261/79.2, 96, 98, 109

[56] References Cited

U.S. PATENT DOCUMENTS

| | | |
|---|---|---|
| 2,582,826 | 1/1952 | Glitsch . |
| 2,596,106 | 5/1952 | Schneible . |
| 2,611,596 | 9/1952 | Glitsch . |
| 2,649,291 | 8/1953 | Bartolucci . |
| 3,008,553 | 11/1961 | Glitsch et al. . |
| 3,013,782 | 12/1961 | Glitsch . |
| 3,019,003 | 1/1962 | Glitsch . |
| 3,037,754 | 6/1962 | Glitsch . |
| 3,079,134 | 2/1963 | Winn . |
| 3,080,155 | 3/1963 | Glitsch et al. . |
| 3,087,711 | 4/1963 | Glitsch . |
| 3,217,469 | 11/1965 | Eckert . |
| 3,233,708 | 2/1966 | Glitsch . |
| 3,343,821 | 9/1967 | Winn et al. . |
| 3,348,364 | 10/1967 | Henby ............................ 261/98 |
| 3,448,038 | 6/1969 | Pall et al. ......................... 261/98 |
| 3,959,419 | 5/1976 | Kitterman . |
| 3,969,447 | 7/1976 | Glitsch et al. . |
| 4,008,056 | 2/1977 | Potter ............................ 261/79.2 |
| 4,086,307 | 4/1978 | Glaspie . |
| 4,120,919 | 10/1978 | McClain . |
| 4,123,008 | 10/1978 | McClain . |
| 4,198,002 | 4/1980 | McClain . |
| 4,333,894 | 6/1982 | Hoppe et al. ..................... 261/96 |
| 4,424,069 | 1/1984 | Chang ........................... 261/79.2 |
| 4,597,916 | 7/1986 | Chen . |
| 4,604,247 | 8/1986 | Chen et al. . |
| 4,729,857 | 3/1988 | Lee et al. . |
| 4,810,428 | 3/1989 | Aly et al. . |
| 4,842,778 | 6/1989 | Chen et al. . |
| 4,909,967 | 3/1990 | Binkley et al. . |
| 4,950,430 | 8/1990 | Chen et al. . |
| 4,956,127 | 9/1990 | Binkley et al. . |

FOREIGN PATENT DOCUMENTS

| | | |
|---|---|---|
| 600807 | 8/1934 | Fed. Rep. of Germany ..... 261/79.2 |
| 764103 | 9/1952 | Fed. Rep. of Germany . |
| 1481836 | 3/1967 | France . |

OTHER PUBLICATIONS

Hydrocarbon Processing, Feb. 1989.
Photocopy Marked as "Exhibit A", Glitsch Inc.

*Primary Examiner*—Tim Miles
*Attorney, Agent, or Firm*—Johnson & Gibbs

[57] ABSTRACT

A vapor horn-packing bed assembly for a chemical process tower incorporating a plurality of directional flow vanes within a 360 degree annular housing. A structured packing bed is disposed centrally of the annular housing and the vapor horn is disposed in flow communication with the packing bed wherein discharged vapor will ascend therethrough. The vapor horn includes a plurality of equally spaced flow vanes positioned for intercepting and diverting the vapor flow downwardly within the tower for generating a substantially homogenous vapor region beneath the packing bed. The homogenous vapor generated by such a vapor horn will comprise a turbulent, gaseous region having sufficiently uniform kinetic energy to present a substantially even ascension front into the packing bed of the vapor horn assembly and other packing beds thereabove.

23 Claims, 4 Drawing Sheets

METHOD OF AND APPARATUS FOR VAPOR DISTRIBUTION

RELATED APPLICATION

This application is a continuation in part of U.S. patent application Ser. No. 07/472,835 filed Jan. 31, 1990 now abandoned.

BACKGROUND OF THE INVENTION

1. Field of the Invention

The present invention relates to chemical process columns and, more particularly, to vapor diffuser assemblies for evenly distributing vapor flow relative to packing beds in such process columns.

2. History of the Prior Art

It is well known in the prior art to utilize various types of exchange columns in which a gas and a liquid come into contact with one another, preferably in a counter-current flow for purposes of mass or heat transfer, close fractionation and/or separation of feed stock constituents, and other unit operations. Efficient operation requires mass transfer, heat transfer, fluid vaporization and/or condensation, whereby one of the fluids can be cooled with a minimum pressure drop through a particular zone or zones of minimum dimensions defined in the area and volume thereof. These are prerequisites for efficient operation and are necessary for close fractionation. For this reason, counter-current flow of vapor and liquid within such exchange columns, or process towers, have become established methods of such vapor liquid contact in the prior art. The actual vapor-liquid interface requires the utilization of a packing bed positioned within the column. Liquid is then distributed atop the packing bed in the most feasible manner while vapor is distributed beneath the packing bed in the lower region of the tower. In this manner, liquid trickling downwardly through the packing bed is exposed to, and in contact with, the vapor ascending therethrough for vapor-liquid contact and interaction.

It is well established that the configuration of the vapor flow in the lower region of the tower adjacent the vapor input nozzle is critical to uniform vapor-liquid contact. This is more so when structured packing beds are utilized as compared to trays. With trays, there is little concern about initial vapor distribution because pressure drop across a trayed column is high. For trayed tower with approximately 50 trays, a pressure drop on the order of 6 PSI (300 mmHg) is common in the prior art. This is, however, more than an order of magnitude greater than the kinetic energy generated by the incoming vapor. The velocity head of vapor entering the distillation column is often greater than 3 to 4 inches of water in refinery heavy oil fractionators whereas the velocity head is no more than 5 mm in chemical or gas treating columns. It is true, however, that when the trays of a 50 tray tower are replaced by packing, the pressure drop through the column is typically reduced by a full order of magnitude, to wit: on the order of 30 mmHg. This is especially true of structured packing such as that set forth and described in U.S. Pat. No. 4,604,247 assigned to the assignee of the present invention. If the kinetic energy of the feed vapor is kept at 10 mm or more, severe mal-distribution will occur. Since it is not usually economical to oversize the vapor nozzle or to enlarge the existing one, a well designed vapor distribution system is absolutely essential for smooth start up and operation.

There are two conventional vapor nozzle designs for crude oil atmospheric or vacuum process towers, to wit: tangential and straight run. When atmospheric and vacuum type towers are addressed, special care is taken to handle the large volume of vapor. Tangential baffles or vapor horns have been incorporated in the prior art. In these configurations, the vapor flow is directed through a housing or horn, and deflected by the baffles prior to ascension through the column. In a straight run configuration, gravity is used to effect the separation of vapor from the solids and liquids that are discharged beneath the vapor trajectory. Upward vapor distribution may also be improved across the column section by utilizing a tapered channel with preset diffuser vanes. With either configuration an additional vapor distribution tray above the feed nozzle may be necessary to insure uniform distribution of the ascending vapor.

Both single and multiple vapor nozzles may be utilized for process columns. Vapor feed nozzles have, for example, been placed 180 degrees apart as well as 90 degrees apart around the circumference of a column. For either configuration, a properly designed vapor distributor is a requirement and select patterns of diffuser vanes may be utilized. With such a configuration it may be necessary to again place an additional vapor distribution tray above the entrance nozzle to insure uniform distribution. This is particularly true of configurations adapted for handling two phase flow. In heavy oil refining, contamination of the vapor from the bottom black oil must be minimized.

It is also conventional in the prior art to use a cylinder having a diameter less than the diameter of the tower for securing a structured packing in the lower region of the tower in which a packed wash oil system can be installed. In many instances tower space outwardly of the packed wash oil system is wasted due to the tower design and the use of conventional vapor diffusers disposed therebeneath. It is critical in any tower designed for maximum efficiency to effectively utilize all tower height for mass and heat transfer. For this reason any tower design that increases the available packing height will generally improve tower performance. It would be an advantage therefore to provide a system which maximizes the available height within the tower for packing to improve performance and to gain additional vessel space for additional packing or for an additional side cut. The present invention provides such an advance over the prior art by utilizing an annular vapor horn housing disposed within the tower and inwardly of which is secured a packing bed to thereby gain usable vessel height for mass transfer therein, as well as improving the initial vapor distribution upwardly therethrough.

SUMMARY OF INVENTION

The present invention relates to vapor distributor assemblies for chemical process columns of the type incorporating a plurality of angulated flow vanes secured within a housing. More particularly, one aspect of the invention includes an improved vapor horn-packing bed assembly for a chemical process column of the type wherein a housing is disposed adjacent a vapor nozzle for distributing vapor therefrom. The improvement comprises an annular housing adapted for securement to the inside wall of the process column adjacent to, and in flow communication with, the vapor nozzle, a plurality of vanes disposed inside the annular housing for directing the flow of vapor from the nozzle and through the housing into the column, and a packing bed disposed within the region defined by the inside annulus walls. The housing may be generally toroidal in shape, comprising a circular inside wall and a ring shaped top plate secured thereto. The vanes disposed within the housing may, in one embodiment of the invention, comprise a plurality of plates, each of the plates including an upper arcuate region adapted for engaging vapor flow from the nozzle and a lower planar section adapted for diverting the engaged vapor flow downwardly. The packing bed is positioned inwardly of the inside wall and fills the central region thereacross. The packing bed is in a position to receive the ascending vapor flow discharged from the annular housing therearound for maximizing efficiency.

In yet another aspect, the invention includes a method of diverting vapor flow within a process column from the vapor nozzle described above for generating a homogenous vapor region for axial ascension into the column structure and maximizing the packing space associated therewith. The method comprises the steps of providing a cylindrical structure having a circular flow region therein to comprise a vapor horn housing. The vapor horn housing is disposed within the column in flow communication with the vapor nozzle. A plurality of vanes are secured within the flow volume of the housing while a packing bed is secured inwardly thereof to occupy the region therewithin. In this manner, usable vessel height is gained to, for example, either increase packing height or to decrease percentage overflash while maintaining a minimum required wash oil rate.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
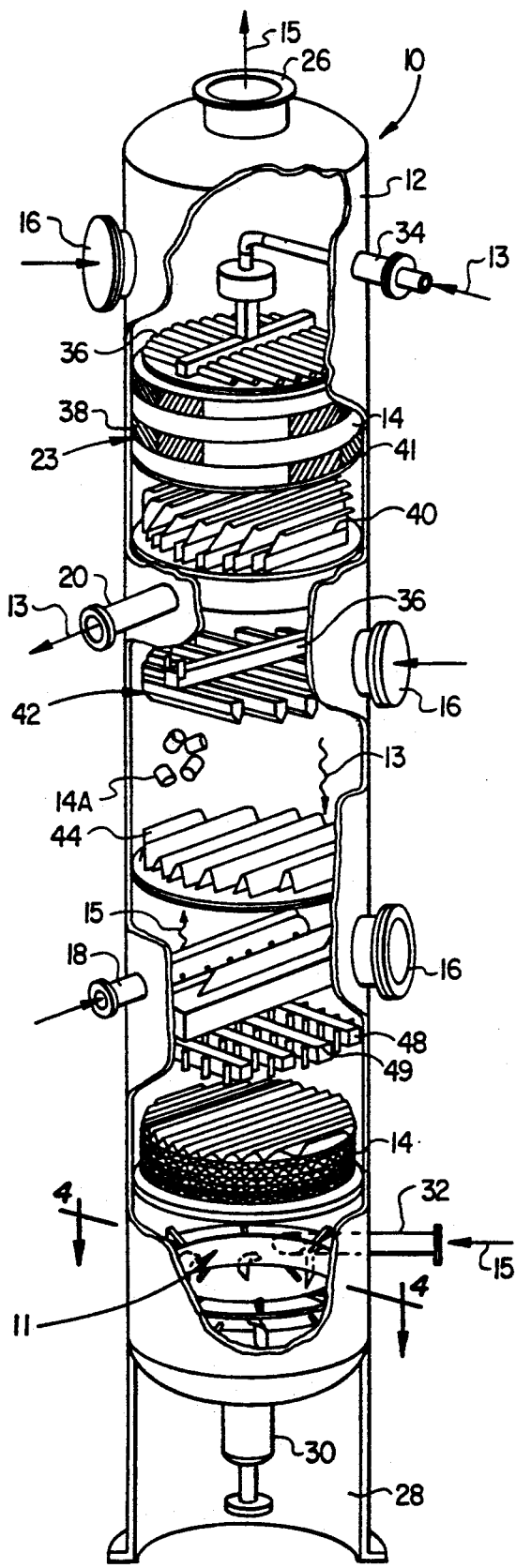
FIG. 1 is a perspective view of a chemical process column with various sections thereof cut away for purposes of illustrating one embodiment of the vapor horn-packing bed assembly of the present invention.

Referring first to FIG. 1 there is shown a perspective view of a packed exchange tower or column with various sections cut away for illustrating a variety of internals and the utilization of one embodiment of the vapor horn-packing bed assembly 11 of the present invention. The exchange column 10 of FIG. 1 comprises a cylindrical tower 12 having a plurality of packing bed layers 14 disposed therein. A plurality of manways 16 are likewise constructed for facilitating access to the internal region of the tower 12 for replacement of the packing beds 14. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the packing beds, and is enriched or added to by material which condenses into it out of the vapor stream.

Still referring to FIG. 1, the exchange column 10 further includes a vapor outlet, overhead line 26 disposed atop the tower 12 and a lower skirt 28 disposed in the lower region of the tower around bottom stream takeoff line 30 coupled to a reboiler (not shown). This is an illustrative assembly only for purposes of discussion and other combinations are typically used. A vapor horn-packing bed assembly 11 connected to a vapor nozzle 32 is shown disposed above the skirt 28 for discharging vapor therein upwardly through the tower 10. It is in this area that both the prior art and the present invention focus on vapor distribution. It is common to use liquid collectors and distributors in conjunction with packing beds, which elements are not necessarily shown herein for purposes of clarity. Prior art baffle and vane assemblies are generally disposed adjacent the nozzle 32 and there is no space available for packing. Reflux from condensers is provided in the upper tower region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing 38. A liquid distributor 42, adapted for redistributing liquid 13, is likewise disposed therebeneath and an intermediate support plate 44 is provided in an alternative configuration of the type adapted for supporting random packing 14A of either a ring or a saddle variety as representatively shown. Another liquid distributor 48 is disposed beneath plate 44 and comprises a plurality of troughs 49. The distributor 48 is constructed in an alternative embodiment utilizing a tube assembly set forth and described in detail in U.S. patent application Ser. No. 266,886, assigned to the assignee of the present invention and incorporated herein by reference. It may be seen from this figure that the counter-current configuration between the ascending vapor 15 and the descending liquid 13 is the subject of a plurality of critical design considerations including liquid/vapor ratios, liquid cooling, foaming and the presence of solids or slurries therein. Corrosion is likewise a consideration of the various elements in the packed towers and the selection of the material in the fabrication of the tower internals is, in many instances, the results of such considerations. The anatomy of the packed column as shown in FIG. 1 is likewise described in more detail in an article by Gilbert Chen entitled "Packed Column Internals" appearing in the Mar. 5, 1984 edition of *Chemical Engineering*. incorporated herein by reference.

Figure 2:
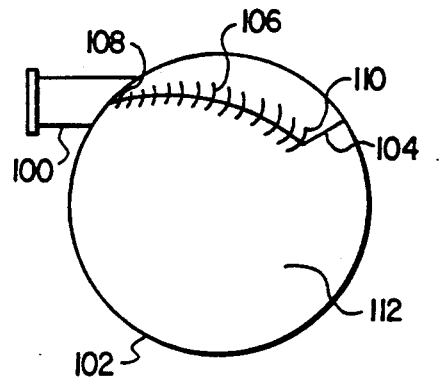
FIG. 2 is a top plan, diagrammatic view of a prior art vapor horn embodiment.

Referring now to FIG. 2, there is shown a top plan diagrammatic view of a prior art vapor diffuser assembly of the type described above. A process column nozzle 100 is shown coupled to a process column 102. Diffuser assembly 104 is mounted within column 102 and is constructed with a plurality of prior art vanes 106. The diffuser vanes 106 are assembled in a variety of lengths for selectively diverting the vapor flow. Shorter diffuser vane 108 is for example disposed adjacent vapor nozzle 100 while a much larger diffuser vane 110 is disposed at the opposite end thereof. The effect of the diffuser vanes 106 is to reduce the directional flow of the vapor discharged from the vapor horn 100 and to cause sufficient turbulence for a degree of homogeneity to be imparted into the internal column region 12. The diffuser vanes 106 are diagrammatically shown for purposes of illustration. Certain housing sections may actually cover various sections or, in some instances, no vanes may be used. In either configuration, there has been no available space recognized for packing beds secured therein.

Figure 3:
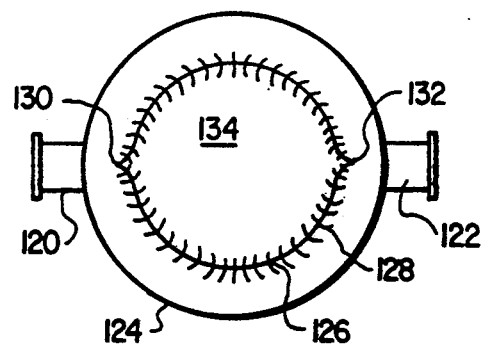
FIG. 3 is a top plan, diagrammatic view of another prior art vapor horn embodiment.

Referring now to FIG. 3, there is shown an alternative embodiment of a prior art vapor diffuser. In this particular configuration, a pair of vapor nozzles 120 and 122 are positioned to discharge vapor from opposite sides of the process column 124. A diffuser assembly 126 is disposed therein having a plurality of diffuser vanes 128 mounted thereon. The orientation, size and configuration of the diffuser vanes 128 are varied depending on the location within the vessel 124 relative to the oppositely disposed nozzles 120 and 122. Adjacent each nozzle 120, 122 is a region of each diffuser 130 and 132, respectively, which is constructed for engaging and initially diverting the vapor flow therefrom. As above, the desired result is a higher degree of homogeneity of vapor flow in the intermediate region 134 between vapor nozzles 120 and 122. The manner in which the vapor is diffused and discharged into the intermediate region of the column and the utilization of available space therein is the subject of the present invention.

Figure 4:
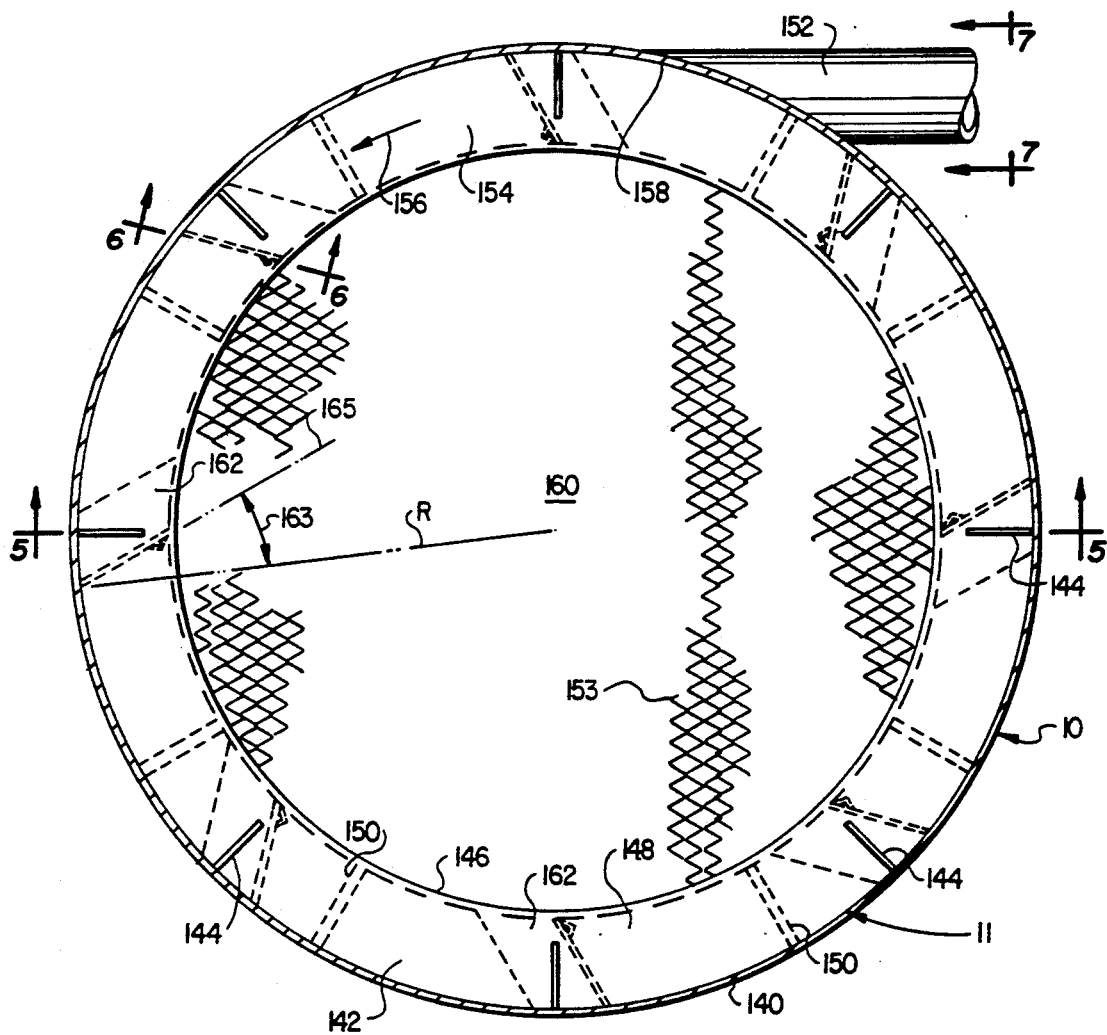
FIG. 4 is an enlarged, top plan view of FIG. 1 taken along lines 4—4 thereof and illustrating one embodiment of the vapor horn-packing bed assembly of the present invention.

Referring now to FIG. 4, there is shown an enlarged top plan view of the vapor horn-packing bed assembly 11 of FIG. 1. In this view, the annular vapor horn housing 11A is disposed within the cylindrical process column or tower wall 140 with a packing bed 153 secured centrally thereof. A top plate 142 comprising a ring shaped member is secured to the wall 140 and forms the top annular surface of the housing 11A. The top plate 142 is structurally secured to the side wall 140 of the tower by plurality of structural gusset plates 144. Plates 144 are fabricated to provide the requisite orthogonal interengagement between the top 142 and the vertical cylindrical walls 140 of the tower. In this configuration welding or similar securement technique are utilized.

Still referring to FIG. 4, the housing 11A is further constructed with an inside wall 146, which is of a generally circular, or cylindrical, configuration forming a ring that is secured to the top 142. It should be noted that the top plan view of inside wall 146 may be comprised of a polygon, having a plurality of flat wall regions defining said "generally circular" configuration. For example, an 8 sided housing 11A has been contemplated in place of a true round cylinder. The vapor horn housing 11A is thereby defined between the top 142 and side 146 with the bottom 148 left open for discharge of vapor from the channel 154 therein. The side wall 146 is also secured to the column wall 140 by the utilization of struts 150 as shown in the present illustration. Other assemblies are also possible. In this configuration, sufficient structural rigidity and flow orientation is provided for disposing the housing 11A adjacent a nozzle 152 in flow communication with the process tower. Vapor nozzle 152 thus feeds the hollow region or channel 154 of the vapor horn 11 for which the vapor flows in the direction of arrow 156. Between the nozzle 152 and the cylindrical side wall of the column 140 an ellipse 158 is formed as described in more detail below. With this flow configuration and a symmetrical array of vanes 162, vapor is diverted into central column region 160 below the packing bed 153 for homogenous ascension therein. The packing bed 153 thus occupies a space made available by the design of the housing 11A and the operation thereof to gain additional packing height in the tower. The symmetrical array of vanes 162 within housing 11A has also been shown to have an optimal efficiency when the angle of each vane to the radial line extended thereto, herein referred to as the radius, is on the order of 30°. Such optional efficiency is important when packing bed 153 is disposed inwardly thereof because the area of unrestricted vapor migration is more limited. As shown in FIG. 4 a radius R (radial line) drawn to the vane 162 from the center C of the column 10 creates an angle 163 relative to a line 165 representing the alignment of said vane 162 relative to said column 10. This angle 163 is preferably typical of all eight (8) vanes as experimentation has proven this to be the most effective angle in a configuration not utilizing packing bed 153.

Figure 5:
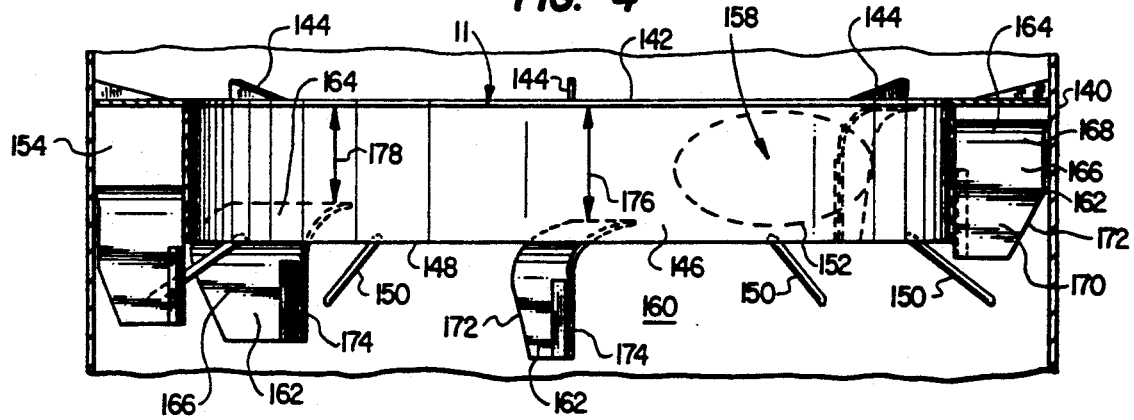
FIG. 5 is an enlarged, side elevational, cross-sectional view of the vapor horn of FIG. 4 taken along lines 5—5 thereof with the packing bed removed for purposes of clarity.

Referring now to FIG. 5, there is shown a side elevational cross-sectional view of the vapor horn 11 of FIG. 4 taken along lines 5—5 thereof. The vapor horn 11 may be seen to comprise a complex integration of the vanes 162 relative to the channel 154 of said vapor horn. The packing bed 153 has been removed from this drawing for purposes of clarity. Each vane 162 is constructed with an upper arcuate region 164 and a lower planar region 166. A rectilinear transition region 168 provides the transition therebetween in a selected configuration adapted for engaging sections of the vapor flow emanating from the vapor horn 11 as described in more detail below. The bottom most region of the vane 170 includes a segmented section 172 that is removed outwardly of the vane 162. Experimentation has resulted in an optimal size of section 172 wherein the axial height thereof is on the order of 50% of the vane height and the width on the order of 33⅓% of the vane width. By removing this lower section in the bottom region 170 of the vane 162 in the proportions described, heavier liquid droplets carried with the vapor stream from a discharge from nozzle 152 will be given an avenue of escape throughout the centrifugal flow pattern within channel 154. Segmented section 172 thus provides an improvement in prior art vane design by facilitating the segregation of liquid from the vapor flow while concomitantly channeling the vapor in a selected flow pattern for maximum homogenous interaction within the tower. Structural struts 174 are constructed within the side walls of the vanes 162 as shown herein.

The positioning of the vanes 152 within the channel 154 is likewise selectively provided. As seen in FIG. 5, the vertical or axial positioning of the vanes 162 within channel 154 is selected to present a staggered array of the vanes relative to the nozzle 152. Vanes 162 closer to the nozzle 152 are positioned in a lower region of the channel 154 so as to engage and divert a select section of the vapor flow therefrom. In this selectively staggered manner, as described in more detail below, a more uniform diverting of the vapor flow is facilitated in a manner maximizing homogenous interaction within the process column. Distance 176 is thus greater than distance 178 as shown in FIG. 5. These distances set forth the dimensional variation between the two respective vanes 162 adjacent the flow nozzle 152. This specific arrangement will be discussed in more detail below.

Figure 6:
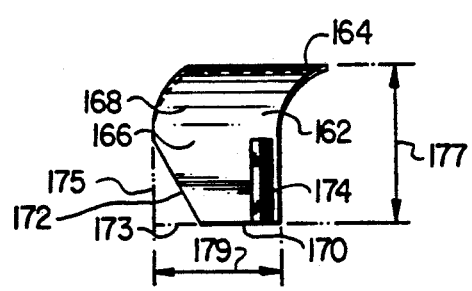
FIG. 6 is an enlarged, front elevational view of a single vane of the vapor horn of FIG. 4.

Referring now to FIG. 6, there is shown a perspective view of a single flow vane 162. The flow vane shown with solid lines to illustrate the arcuate top region 164 and the curvalinear transition region 168 connecting to planar section 166. With this particular configuration vapor flow is engaged and diverted downwardly. The structural section 174 is provided for affording increased structural rigidity at the outer region thereof where deflection is most likely to occur. Likewise the segmented section 172 is provided so that in the angulated configuration illustrated in FIG. 4, the vapor and liquid impacted thereagainst will be diverted, with the liquid finding one avenue of escape by virtue of the segmented sections. The segment 172 is shown to have an axial height 175 on the order of 50% of the height 177 of the vane 162. The segmented section 172 also has a width 173 on the order of 33⅓% of the width 179 of the vane 162. In this proportion a high level of efficiency has been found to prevail over a wide operational spectrum.

Figure 7:
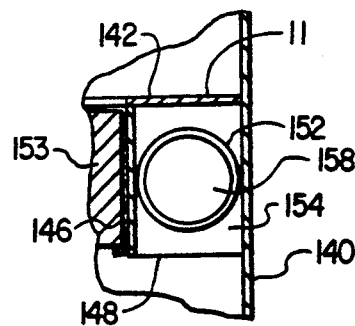
FIG. 7 is a side elevational, cross-sectional view of the vapor horn of FIG. 4 taken along lines 7—7 thereof and illustrating the vapor nozzle relative to the vapor horn housing.

Referring now to FIG. 7, there is shown a side elevation, cross-sectional view of the vapor nozzle of FIG. 4 with fragmentary portions cut away for purposes of clarity. A side portion of the packing bed 153 may be seen. This particular illustration also shows the cross-sectional configuration of the channel 154 which is defined by the column side wall 140, vapor horn top 142 and vapor horn inside wall 146. The bottom 148 is open to discharge vapor therefrom for ascension through the bed 153. The diameter of the vapor nozzle 152 is substantially equivalent to or less than the width of the channel 154 and thus the volume of flow of vapor into the channel 154 is not adversely affected by a pressure increase. The pressure increase or "back pressure" can result if the flow area within a channel is equal or less than the flow area of the nozzle 152, particularly with the presence of vanes 162 which selectively impede the vapor flow therein. With the channel 154 having a cross-sectional area greater than the cross-sectional area of the nozzle 152, the back pressure problem is eliminated.

Figure 8:
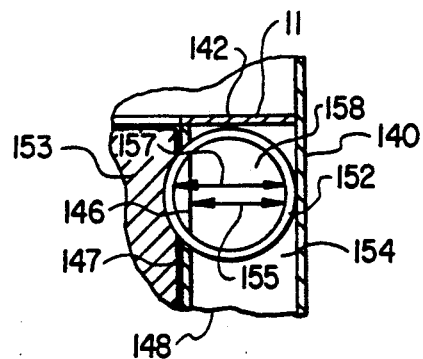
FIG. 8 is an alternative embodiment of the vapor nozzle and vapor horn housing assembly illustrating the structural modification for flow volume sizing.

Referring now to FIG. 8, there is shown an alternative embodiment of the vapor nozzle-vapor horn interface with a fragmentary portion of the packing bed 153 shown adjacent thereto. In this particular illustration, the vapor nozzle 152 has a diameter 157 which is greater than the width 155 of channel 154. With such a configuration, a view of the vapor horn through the vapor nozzle 152 will result in the appearance of the side wall 146 therein. This is because the width 155 of the channel 154 is less than the diameter 157 and therefore the inside walls 146, through its arcuate formation, will appear therein. The result thereof is the necessity for increasing the overall cross-sectional area of the channel 154 by extending the side wall 146 downwardly. A more rectangular configuration is thus presented in FIG. 8 as compared to than that shown in FIG. 7. In this manner, the rectangular, cross-sectional area of the vapor horn channel 154 is sufficiently greater than the circular, cross-sectional area of the vapor nozzle 152 for presenting a flow configuration with limited back pressure problems. Likewise, the bottom region 148 remains open for the discharge of vapor therefrom, said vapor discharge being effected by the vanes 162 described above.

Figure 9:
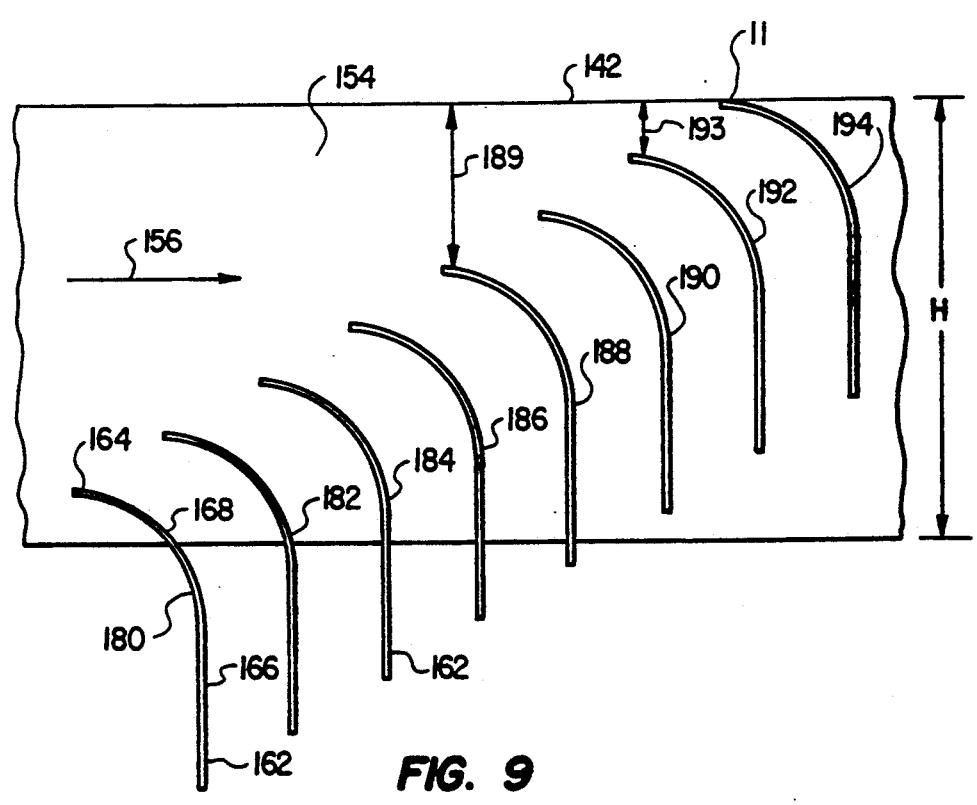
FIG. 9 is an enlarged, side elevational, diagrammatic view of the flow vanes of the vapor horn of FIG. 4 illustrating their relative positioning within the housing.

Referring now to FIG. 9, there is shown an enlarged, diagrammatic, cross-sectional view of the channel 154 of the vapor horn illustrating a series of eight flow vanes disposed adjacent one another therein. The flow vanes 162 in the vapor horn channel 154 are diagrammatically shown adjacent one another for purposes for illustrating the variation in height therebetween. The flow of vapor within the channel 154 is illustrated by the arrow 156. The construction of each vane 162 includes an arcuate top region 164 above a planar bottom region 166. As described above, a curvalinear transition region 168 connects said upper and lower regions.

As shown in FIG. 9 the eight flow vanes 162 are each constructed of substantially equal size and shape. The vane 180 is positioned nearest the nozzle (not shown) for purposes of engaging ad deflecting the lower most region of vapor discharge therefrom. Vane 182 is raised upwardly therefrom an incremental distance facilitating engagement of a larger region of the flow channel 154. With the lower portion of the flow volume removed by vane 180, vane 182 is permitted to discharge a substantially equal amount of vapor although the vapor engagement area within channel 154 is somewhat larger than that of vane 180. Likewise, vane 184 projects a distance into channel 154 a distance greater than that of either vane 180 or 182. Vanes 186, 188, 190, 192, and 194 are each staggered upwardly to engage more area of vapor flow within channel 154. Distance 189 is, in the present embodiment, on the order of ⅜ of the height H of channel 154. Distance 193, in the present embodiment, is on the order of ⅝ of the height of channel 154.

Figure 10:
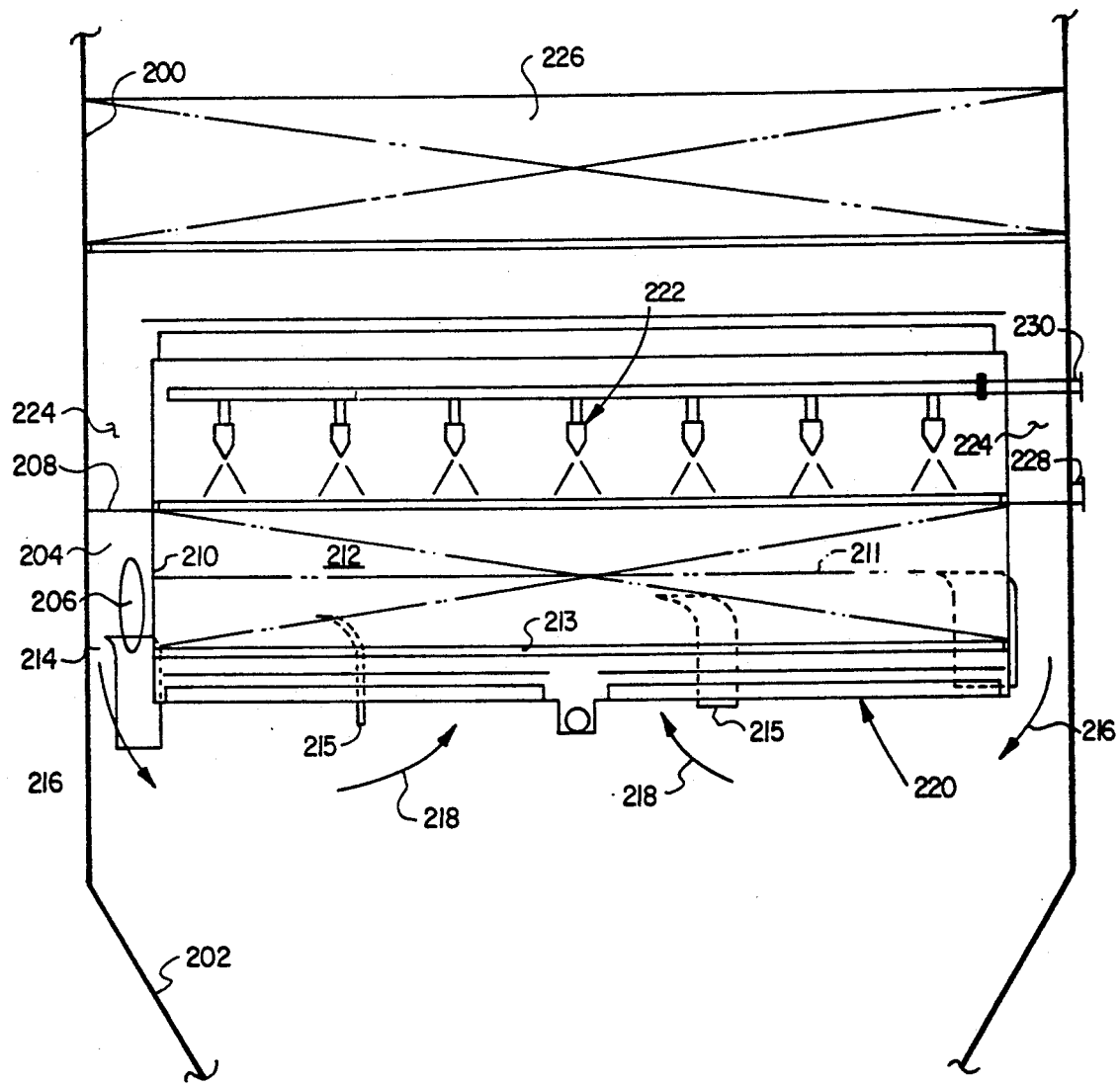
FIG. 10 is an enlarged, side elevational diagrammatic schematic of the vapor horn-packing bed assembly of the present invention illustrating select structural features thereof.

Referring now to FIG. 10, there is shown an enlarged, side elevational diagrammatic schematic of the vapor horn-packing bed assembly of the present invention illustrating select structural features thereof. A tower 200 is thus shown with lower tapering walls 202 above which is secured a vapor horn housing 204 having elliptical nozzle 206. The vapor horn housing 204 comprises an annular structure having a top 208 and an inside wall 210 against which is secured a generally cylindrical packing bed 212 extending thereacross. A lower portion 214 of the vapor horn housing 204 is open to facilitate the discharge of vapor downwardly therefrom as shown by arrow 216, which downwardly discharged vapor accumulates and rises upwardly in the direction of arrows 218 as shown herein. The ascending vapor 218 passes through the packing bed 212 for mass and heat transfer.

Still referring to FIG. 10, an optional collector tray 220 is diagrammatically shown for purposes of illustration. Likewise, a series of discharge nozzles 222 are disposed above packing bed 212 for illustrating the availability of a separate feed thereto. In the region immediately above, the diameter of the feed nozzle assembly 222 is, in this embodiment, equivalent to the diameter of the vapor horn-packing bed 212, whereby an annular trough 224 is formed therearound. The trough 224 comprises an area for collection of liquid (sump) descending downwardly from an upper packing bed 226 and which liquid accumulation may be discharged through orifice 228. This is a distinct advantage of the vapor horn housing 11A of the present invention which affords this opportunity in conjunction with the intermediate packing 153 therein. Likewise, a feed pipe 230 is shown to supply nozzle assembly 222.

The above-described configuration of the vapor horn-packing bed assembly of FIG. 10 is but one embodiment thereof presented for purposes of illustrating certain ones of the advantages of the present invention. With such an assembly, useful vessel height is provided in combination with the annular vapor horn housing. The useful vessel height within the annulus of the vapor horn is effectively used for the placement of packing, such as structured packing, to increase the packing height for the tower itself. In such an embodiment the increased packing height may improve a wash oil section performance as well as decrease the percentage overflash while maintaining a minimum required wash oil rate. As stated above, this configuration also gains additional vessel space for additional side cuts or thicker packing beds in other zones of the tower (not shown). What is shown in this embodiment is the ability to utilize the annular vapor horn housing 204 in combination with an upper liquid discharge assembly, in the form of nozzle assembly 222, to establish a fluid collection trough 224 for select applications. As stated above, such designs which effectively utilize more available space within the tower 200 consequently increase the efficiency and effectiveness of the tower.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

We claim:

1. An improved vapor horn for a chemical process column of the type wherein a housing is disposed within said column adjacent a vapor nozzle for distributing said vapor therefrom into a vapor region, said improvement comprising:
said housing adapted for securement to the inside wall of the process column adjacent to and in flow communication with said vapor nozzle;
a plurality of vanes of predefined height symmetrically disposed within said housing for directing the flow of vapor downwardly from said nozzle and through said housing into a lower area in said column to establish a homogenous vapor region for ascension through said column;
said housing comprising a generally cylindrical inside wall and a top plate secured thereabove;
a packing bed disposed adjacent to and inwardly of said cylindrical inside wall for receiving the ascending vapor discharged from said housing; and
said vanes of said housing being axially staggered therein and comprising a plurality of angulated plates, each of said plates having a predefined width and including an upper arcuate region adapted for engaging vapor flow from said nozzle and a lower planar section adapted for diverting said engaged vapor flow, said plates being secured within said housing at a predefined angle.

2. The apparatus as set forth in claim 1 wherein 8 vanes are disposed within said housing symmetrically therearound and said lower planar section of each of said plates is constructed with an outer segmented portion having sufficient width for facilitating the escape of liquid dispersed thereupon during vapor flow, said segmented portion having an axial height on the order of 50% of said vane height.

3. The apparatus as set forth in claim 2 wherein said symmetrically positioned vanes are each axially staggered one to the other a distance on the order of ⅛ of the height of said channel of said vapor horn.

4. The apparatus as set forth in claim 1 wherein said housing includes a top with said top secured to said column by a plurality of structural member welded thereto, said top defining the bottom of an annular fluid collection trough formed thereabove.

5. The apparatus as set forth in claim 4 wherein said housing is further constructed with a generally cylindrical, circular inside wall, with said inside wall being secured to said column by a plurality of struts secured therearound and said inside wall being formed with means for supporting said packing bed therein.

6. The apparatus as set forth in claim 5 wherein said vanes are disposed within said housing at an angle relative to said vapor nozzle discharging said vapor inwardly and downwardly therefrom and said support means comprises a support ring secured to said circular inside wall and projecting inwardly beneath said packing bed for the support thereof.

7. The apparatus as set forth in claim 1 wherein said packing bed comprises at least one layer of corrugated structured packing.

8. The apparatus as set forth in claim 7 wherein said packing bed comprises a plurality of layers of corrugated structured packing.

9. An improved vapor horn assembly for a chemical process column of the type wherein a vapor diffuser housing is disposed within said column adjacent a generally cylindrical vapor nozzle for distributing said vapor therefrom into a vapor region, said improvement comprising:
said housing adapted for securement to the inside wall of the process column adjacent to and in flow communication with said vapor nozzle;
a packing bed secured inwardly of said housing and disposed across said column;
a plurality of vanes of predefined height symmetrically disposed within said housing for directing the flow of vapor from said nozzle and through said housing into an area beneath said column for establishing a homogenous vapor region for ascension through said packing bed;
said housing being generally rectangular in cross-sectional construction and comprising a circular inside wall and a top plate secured thereabove, the width of said axial length of said circular inside wall being greater than the diameter of said cylindrical nozzle;

means associated with said inside wall for supporting said packing bed; and said vanes of said housing being axially staggered within said housing and comprising a plurality of angulated plates.

10. The apparatus as set forth in claim 9 wherein said packing bed comprises at least one layer of corrugated, structured packing.

11. The apparatus as set forth in claim 10 wherein said packing bed comprises a plurality of layers of corrugated, structured packing.

12. The apparatus as set forth in claim 9 wherein each of said plates includes a predefined width and an upper arcuate region adapted for engaging vapor flow from said nozzle and a lower planar section adapted for diverting said engaged vapor flow, said plates being secured within said housing at a predefined angle.

13. The apparatus as set forth in claim 9 wherein said lower planar section of said plates are generally constructed with an outer segmented portion having sufficient width for facilitating the escape of liquid dispersed thereupon during vapor flow.

14. The apparatus as set forth in claim 13 wherein said segmented portion has an axial height on the order of 50% of said vane height.

15. The apparatus as set forth in claim 13 wherein said segmented portion of said plates have a width on the order of $33\frac{1}{3}\%$ of said width of said plates.

16. The apparatus as set forth in claim 9 wherein 8 vanes are disposed within said housing symmetrically therearound.

17. The apparatus as set forth in claim 16 wherein said symmetrically positioned vanes are each staggered one to the other a distance on the order of $\frac{1}{8}$ of the height of said channel of said vapor horn.

18. The apparatus as set forth in claim 9 wherein said housing includes a top with said top secured to said columns by a plurality of structural members welded thereto.

19. The apparatus as set forth in claim 18 wherein said housing is further constructed with a generally cylindrical, inside wall, with said inside wall being secured to said column by a plurality of struts secured therearound.

20. The apparatus as set forth in claim 18 wherein said top comprises the bottom of an annular liquid collection trough disposed above said vapor horn.

21. The apparatus as set forth in claim 9 wherein said support means comprises a support ring secured to said circular inside wall and projecting inwardly beneath said packing bed for the support thereof.

22. An improved vapor horn for a chemical process column of the type wherein a housing is disposed within said column adjacent a vapor nozzle for distributing said vapor therefrom into a vapor region for upward ascension through packing beds disposed within said column, said improvement comprising:

said housing adapted for securement to the inside wall of the process column adjacent to and in flow communication with said vapor nozzle;

a plurality of vanes of predefined height disposed within said housing for directing the flow of vapor from said nozzle and through said housing into an area therebeneath for establishing a homogenous vapor region;

said housing comprising a circular inside wall and a top plate secured thereabove;

a first packing bed adapted for positioning adjacent to and inwardly of said housing; and means associated with said housing for supporting said packing bed in a position relative to said housing for receiving said ascending vapor therethrough.

23. An improved method of distributing vapor with a vapor horn in a chemical process column of the type wherein a housing is disposed within said column adjacent a vapor nozzle for distributing said vapor therefrom into a vapor region and upwardly through packing beds disposed within said column, said improvement comprising the steps of:

securing said housing to the inside wall of the process column adjacent to and in flow communication with said vapor nozzle;

securing a first packing bed adjacent to and inwardly of said housing and across said column; and providing a plurality of vanes of predefined height symmetrically within said housing for direction the flow of vapor from said nozzle and through said housing into an area therebeneath for establishing a homogenous vapor region for ascension upwardly through said first packing bed.

* * * * *

UNITED STATES PATENT AND TRADEMARK OFFICE
CERTIFICATE OF CORRECTION

PATENT NO. : 5,106,544
DATED : April 21, 1992
INVENTOR(S) : A. Lee, G. Chen, T. Holmes It is certified that error appears in the above-identified patent and that said Letters Patent is hereby corrected as shown below:

```
Column 5, line 17        delete "."
                         insert --,--

Column 5, line 32        delete "12"
                         insert --112--

Column 8, line 38        delete "ad"
                         insert --and--
```

Signed and Sealed this

Tenth Day of August, 1993

Attest:

MICHAEL K. KIRK

Attesting Officer

Acting Commissioner of Patents and Trademarks